United States Patent
Fukano et al.

(10) Patent No.: US 6,666,429 B2
(45) Date of Patent: Dec. 23, 2003

(54) FLOW RATE CONTROL VALVE

(75) Inventors: Yoshihiro Fukano, Kitasoma-gun (JP); Kousaku Inamoto, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 142 days.

(21) Appl. No.: 10/006,370

(22) Filed: Dec. 10, 2001

(65) Prior Publication Data
US 2002/0070370 A1 Jun. 13, 2002

(30) Foreign Application Priority Data
Dec. 11, 2000 (JP) .................................. 2000-376641

(51) Int. Cl.⁷ .................................................. F16K 31/06
(52) U.S. Cl. ............................... 251/129.04; 251/129.15
(58) Field of Search ........................ 251/129.01–129.22

(56) References Cited

U.S. PATENT DOCUMENTS

| | | | | |
|---|---|---|---|---|
| 3,801,063 A | * | 4/1974 | Holmes et al. ............... | 251/33 |
| 5,441,233 A | * | 8/1995 | Asou et al. ............ | 251/129.15 |
| 5,657,962 A | * | 8/1997 | Neron et al. ........... | 251/129.15 |
| 5,741,002 A | | 4/1998 | Breyer | |
| 5,992,822 A | * | 11/1999 | Nakao et al. .......... | 251/129.15 |
| 6,062,824 A | * | 5/2000 | Kimura et al. ......... | 251/129.15 |
| 6,336,621 B1 | * | 1/2002 | Ii et al. ................. | 251/129.15 |

FOREIGN PATENT DOCUMENTS

| | | |
|---|---|---|
| DE | 199 14 372 A1 | 10/2000 |
| EP | 1 013 982 A1 | 6/2000 |

* cited by examiner

*Primary Examiner*—Paul J. Hirsch
(74) *Attorney, Agent, or Firm*—Paul A. Guss

(57) ABSTRACT

A flow rate control valve includes a coil disposed in a first body, a movable iron core axially displaceable under a magnetically exciting action of the coil, a fixed iron core fixed in the first body, a fluid supply port supplied with a fluid, a fluid discharge port discharging the fluid, a projection formed for a diaphragm which is connected to the movable iron core and which is formed of an elastic member, a valve seat for the projection to be inserted therein, and a spring which urges the movable iron core to separate from the fixed iron core in a non-excited state.

5 Claims, 3 Drawing Sheets

FLOW RATE CONTROL VALVE

BACKGROUND OF THE INVENTION

1. Field of the Invention

The present invention relates to a flow rate control valve which can control the flow rate of a fluid. In particular, the present invention relates to a flow rate control valve of a proportional type using a solenoid.

2. Description of the Related Art

A flow rate control valve has been conventionally used to control the flow rate of a fluid flowing through a passage by changing the passage area in the valve if a pressure fluid is supplied to or discharged from an actuator.

According to a conventional flow rate control valve 1 shown in FIG. 3, a fluid passage 8 is generally opened and closed by manually operating a handle section 2 to enable a valve rod 4 to advance and retreat in an axial direction of the flow rate control valve 1. The handle section 2 is disposed upwardly of a body 3.

In the above case, a tapered tip end 9 of the valve rod 4 held by a seal 5 faces the fluid passage 8 defined between a fluid supply port 6 and a fluid discharge port 7. The flow rate of the fluid flowing from the fluid supply port 6 to the fluid discharge port 7 is controlled by the inserted degree of the tip end 9 into the fluid passage 8.

In the above conventional flow rate control valve 1, the manual operation enables the tip end 9 (valve plug) of the valve rod 4 to advance and retreat. However, the valve opening degree cannot be constantly controlled to a desired value since the above advancing and retreating movement is performed depending upon the operator's manual operation.

Further, the operator's manual operation cannot keep the fluid passage 8 and the valve plug airtight and liquid-tight with the valve plug being completely closed.

SUMMARY OF THE INVENTION

It is a general object of the present invention to provide a flow rate control valve which can set an arbitrary flow rate by electrically controlling the opening and closing operation of a valve plug and which can control the flow rate of a fluid highly accurately.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
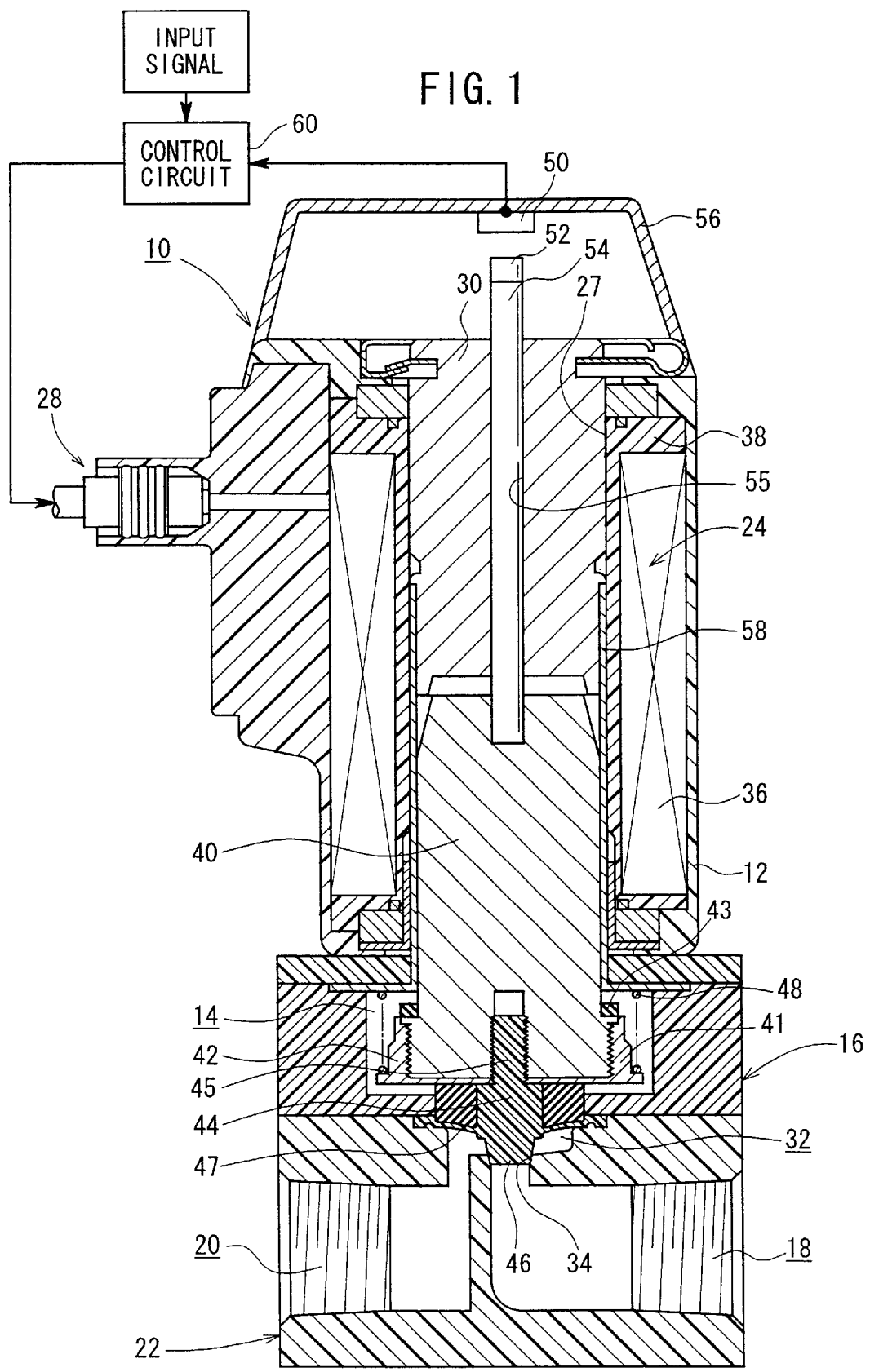
FIG. 1 is a vertical sectional view taken along an axial direction illustrating a flow rate control valve according to an embodiment of the present invention.

With reference to FIG. 1, reference numeral 10 indicates a flow rate control valve according to an embodiment of the present invention.

The flow rate control valve 10 basically comprises a cover member 56 disposed upwardly of the flow rate control valve 10, a first body 12 serially disposed downwardly of cover member 56, a second body 16 serially disposed downwardly of the first body 12 and having a first chamber formed at a substantial center thereof, and a third body 22 having a fluid supply port 18 and a fluid discharge port 20 which are formed therein. The fluid supply port 18 is supplied with a fluid by an unillustrated pressure fluid supply source. The fluid discharge port 20 discharges the fluid supplied to the fluid supply port 18.

A solenoid 24 is disposed near the outer circumference of the first body 12. A fixed iron core 30 and a movable iron core 40 are coaxially arranged respectively in a hole 27. The hole 27 is formed in the solenoid 24.

An electric signal connector 28 is integrally disposed a side surface of the first body 12. The electric signal connector 28 supplies the electric current to the solenoid 24. The solenoid 24 has a bobbin 38 for winding a coil 36 therearound. An unillustrated electric cable is connected to the electric signal connector 28. An electric signal is inputted through the electric cable.

A ring 58 composed of a magnet is inserted into the hole 27 of the first body 12. The ring 58 extends over the fixed iron core 30 and the movable iron core 40.

The movable iron core 40 is inserted into the ring 58.

The movable iron core 40 is axially displaceable under the urging action of the solenoid 24. A disk 42 is screwed on an end of the movable iron core 40 by an annular projection 41. A spring 48 is interposed between an outer edge of the disk 42 and a bent portion of the ring 58. The spring 48 urges the disk 42 to separate from the ring 58.

An annular buffer 43 composed of an elastic material such as rubber is installed to the outer circumferential surface of the movable iron core 40. The buffer 43 absorbs the shock exerted if the movable iron core 40 is magnetically excited to reach the displacement terminal end position.

The third body 22 includes the fluid supply port 18 formed on a side thereof, the fluid discharge port 20 formed at another side thereof opposite to the fluid supply port 18, a second chamber 32 defined between the fluid supply port 18 and the fluid discharge port 20, and a valve seat 34 formed between the second chamber 32 and the fluid supply port 18.

A diaphragm (valve plug) 44 composed of an elastic material includes a tapered projection 46 which can be seated on the valve seat 34 and which has its diameter gradually reducing, a shaft 45 axially protruding in an opposite direction to the projection 46, and a thin-walled skirt section 47 extending radially outwardly from the projection 46. The shaft 45 is screwed in a screw hole disposed at a substantial center of the movable iron core 40 through a through-hole of the disk 42. That is, the diaphragm 44 is integrally connected to the movable iron core 40.

The outer circumferential edge of the skirt section 47 is interposed between a groove of the second body 16 and the third body 22.

According to the embodiment of the present invention, a rod (rod member) 54 composed of a non-magnetic member is installed to the other end of the movable iron core 40. The rod 54 penetrates through a through-hole 55 formed at a substantial center of the fixed iron core 30. The rod 54 protrudes by a predetermined length from the upper surface of the fixed iron core 30. A magnetic member (detected object) 52 composed of a permanent magnet or the like is secured to the upper end of the rod 54. The magnetic member 52 faces a sensor 50 (detecting mechanism) secured in the cover member 56.

The sensor 50 is composed of a magnetization-detecting sensor or the like such as a Hall effect element and a magnetic resistance element. The sensor 50 senses the change of the magnetic field. The magnetic field changes depending on the approaching distance of the magnetic member 52 disposed at the upper end of the rod 54. The sensor 50 outputs a detection signal as an electric signal.

Figure 2:
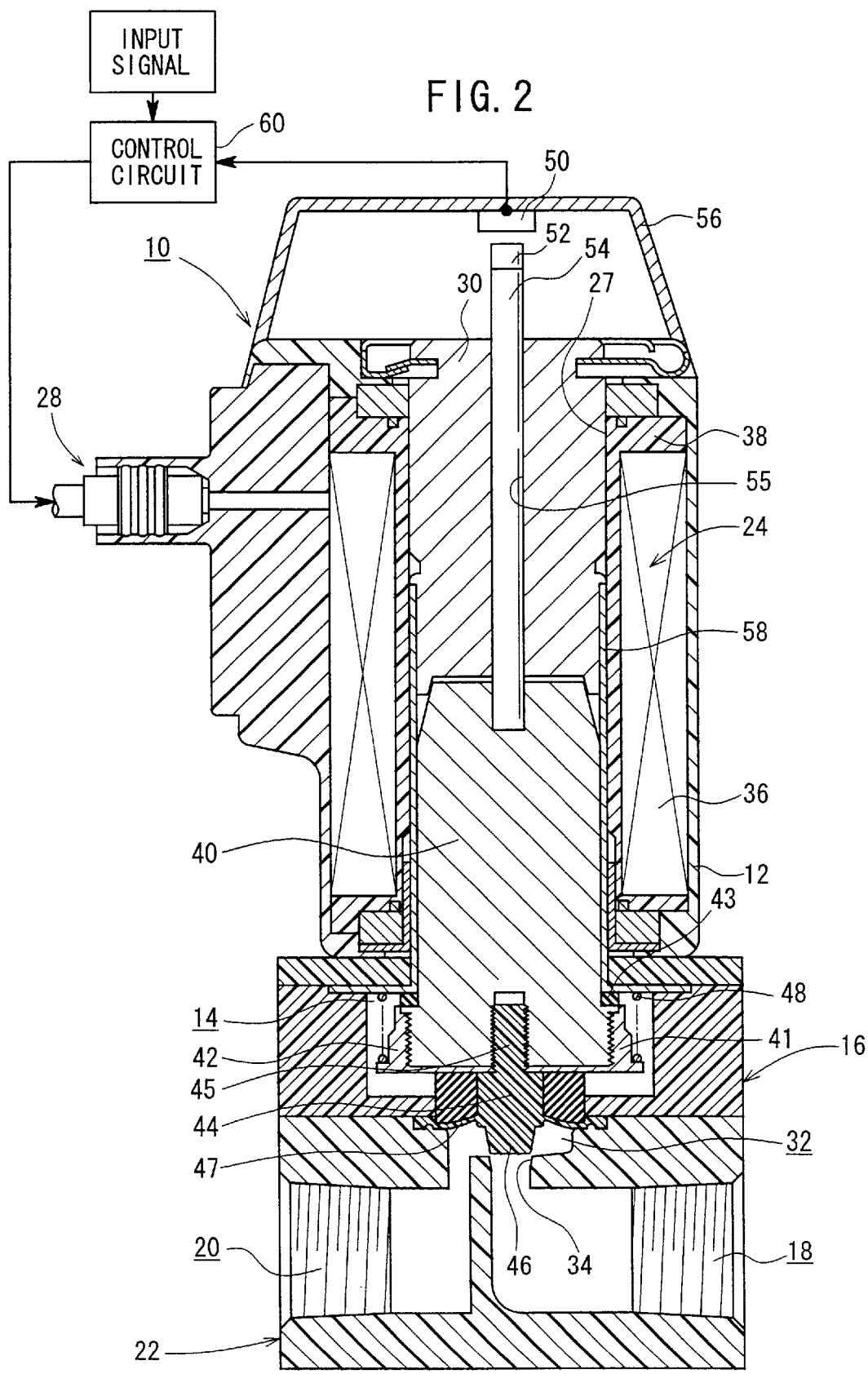
FIG. 2 is a vertical sectional view taken along the axial direction illustrating the flow rate control valve which is switched into the opened state from the closed state shown in FIG. 1.
Figure 3:
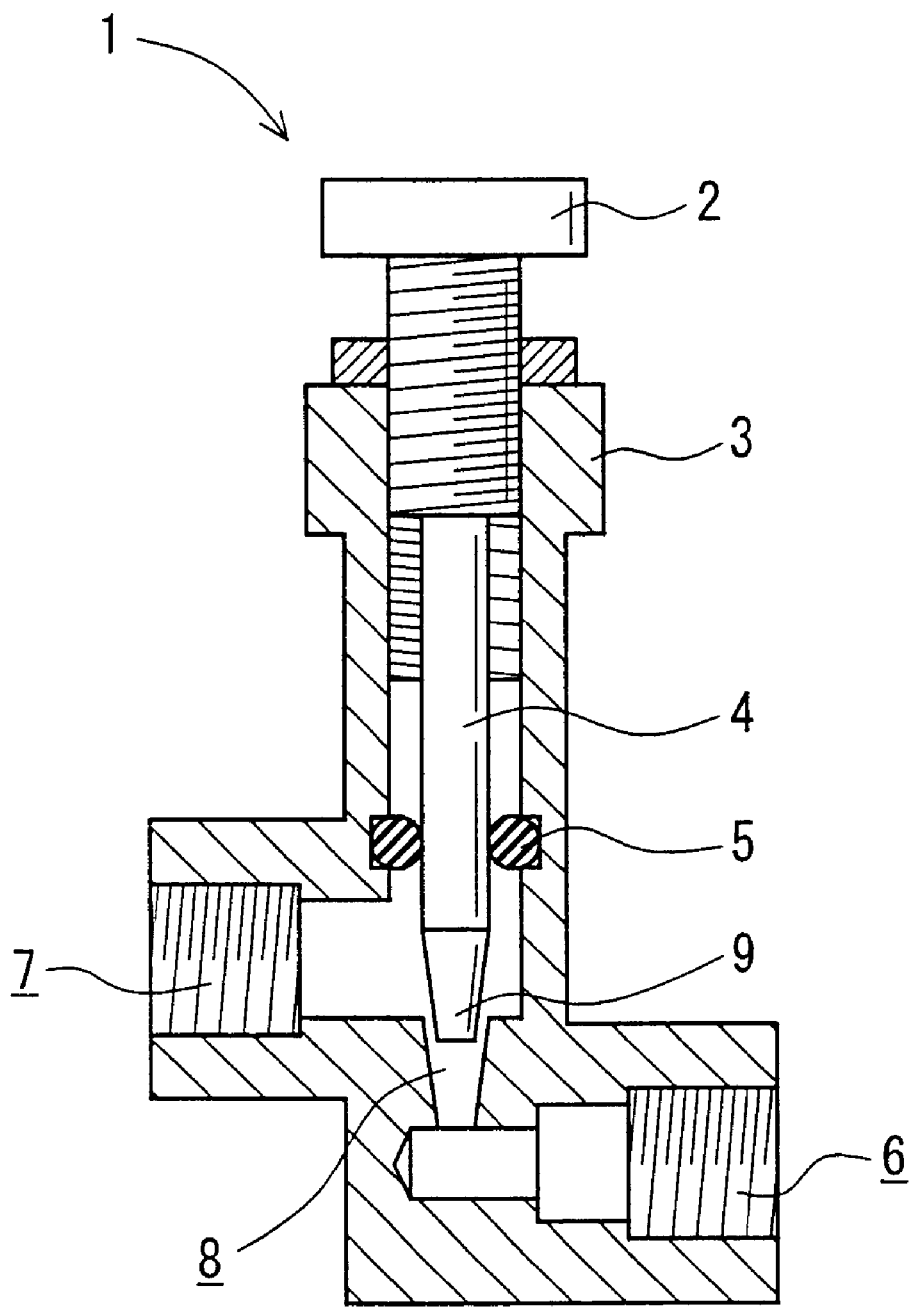
FIG. 3 is a vertical sectional view taken along an axial direction illustrating a conventional flow rate control valve.

As shown in FIGS. 1 and 2, reference numeral 60 indicates a control circuit. The control circuit 60 compares a preset signal (input signal) previously set by an unillustrated inputting means with the output signal of the sensor 50 so as to control the current for the solenoid 24. The control circuit 60 is electrically connected to the electric signal connector 28 and the sensor 50 through the unillustrated electric cable.

The flow rate control valve 10 according to the embodiment of the present invention is basically thus constructed. Its operation, function, and effect will be explained below.

FIG. 1 shows a non-excited state in which the current is not supplied to the coil 36 of the solenoid 24. The diaphragm 44 (valve plug) is completely closed in the non-excited state. Specifically, the projection 46 of the diaphragm 44 abuts against the valve seat 34 to block the communication between the fluid supply port 18 and the second chamber 32.

More specifically, the movable iron core 40 is pressed downwardly under the spring action of the spring 48 interposed between the disk 42 and the second body 16. The projection 46 of the diaphragm 44 integral with the substantial center of the movable iron core 40 is inserted into the valve seat 34.

The projection 46 composed of the elastic member is pressed against the valve seat 34. The projection 46 is thus inserted and suitably fitted into the valve seat 34 to block the communication between the fluid supply port 18 and the second chamber 32. The fluid supply port 18 and the fluid discharge port 20 can consequently be kept airtight or liquid-tight.

Further, even if the current is not supplied to the solenoid 24, the movable iron core 40 is constantly prevented from upwardly moving under the spring action of the spring 48 interposed between the disk 42 and the second body 16. Therefore, the fluid supply port 18 and the second chamber 32 can be reliably kept airtight or liquid-tight.

While the diaphragm 44 is closed, if the current is supplied to the coil 36 of the solenoid 24 by the electric signal connector 28 from the unillustrated current supply source, the coil 36 is magnetically excited in proportion to the inputted current value. The movable iron core 40 is displaced toward the fixed iron core 30 under the magnetically exciting action of the coil 36. The buffer 43 disposed on the annular projection 41 of the movable iron core 40 abuts against the ring 58 at the displacement terminal end position. The fluid supply port 18 communicates with the second chamber 32 to open the diaphragm 44. That is, as shown in FIG. 2, the diaphragm 44 is switched from the closed state in which the communication is blocked between the fluid supply port 18 and the fluid discharge port 20 to the opened state in which the communication is provided therebetween.

Upon the arrival at the displacement terminal end position, the buffer 43 disposed on the movable iron core 40 abuts against the ring 58 to absorb the shock of the abutment.

In the above case, the sensor 50 can detect the lifted amount of the projection 46 from the valve seat 34 by sensing the change of the magnetic field. The magnetic field changes depending on the axially approaching distance between the sensor 50 and the magnetic member 52 disposed at the tip end of the rod 54. Consequently, the diaphragm 44 can be proportionally controlled to be opened and closed.

The control circuit 60 is controlled to correct the deviation between the detection signal derived from the sensor 50 and the previously inputted input signal (preset signal). The feedback is performed for the input value of the electric signal. The corrected electric signal is inputted from the electric signal connector 28 into the solenoid 24. Thus, the error of the opening degree of the diaphragm 44 can be decreased.

The movable iron core 40 is displaced toward the fixed iron core 30 against the spring 48 interposed between the disk 42 and the second body 16. The diaphragm 44 is also displaced integrally with the movable iron core 40.

Accordingly, the projection 46 separates from the valve seat 34 to provide the communication for the fluid supply port 18 and the second chamber 32. The fluid supply port 18 and the fluid discharge port 20 are also communicated with each other. The pressure fluid is introduced from the fluid supply port 18 into the second chamber 32 and is discharged from the fluid discharge port 20.

As is apparent from the above description, in the embodiment of the present invention, the diaphragm 44 can be electrically controlled to be opened and closed highly accurately in proportion to the inputted current value.

Further, it is not necessary to dispose the handle section 2 for opening and closing the valve plug, the handle section 2 being disposed upwardly of the conventional flow rate control valve. Consequently, the height dimension can be decreased and the entire flow rate control valve can be minimized.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A flow rate control valve comprising:
   a solenoid section disposed in a body of said flow rate control valve, for performing magnetic excitation by a current;
   a fixed iron core disposed in said body;
   a movable iron core axially displaceable under a magnetically exciting action of said solenoid section;
   a pair of fluid ports supplied with or discharging a fluid;
   a valve plug connected to an end of said movable iron core and formed of an elastic material; and
   a valve seat section for enabling said valve plug to be seated thereon,
   wherein a flow rate of said fluid is controlled by said current supplied to said solenoid section, said fluid flowing between said valve plug and said valve seat section.

2. The flow rate control valve according to claim 1, further comprising a rod member penetrating through said fixed iron core and having an end connected to said movable iron core and another end connected to a detected object, wherein a lifted amount of said valve plug is detected by a detecting mechanism for detecting a displacement amount of said detected object displaceable integrally with said rod member.

3. The flow rate control valve according to claim 2, wherein said detecting mechanism is a sensor for sensing a change of a magnetic field, said magnetic field being changed by displacement of said detected object formed of a magnetic material.

4. The flow rate control valve according to claim 2, further comprising a control circuit for controlling said current supplied to said solenoid section, wherein said control circuit is supplied with a detection signal introduced from said detecting mechanism to correct deviation between a previously set input signal and said detection signal, said solenoid section being supplied with a corrected electric signal by said control circuit.

5. The flow rate control valve according to claim 3, wherein said movable iron core, said rod member, and said sensor are coaxially disposed in said solenoid section.

\* \* \* \* \*